United States Patent
Kozlowski et al.

(10) Patent No.: US 10,394,768 B2
(45) Date of Patent: Aug. 27, 2019

(54) SELECTIVE DATA MIGRATION ON SCHEMA BREAKING CHANGES

(71) Applicant: Microsoft Technology Licensing, LLC, Redmond, WA (US)

(72) Inventors: Dawid Dariusz Kozlowski, Issaquah, WA (US); Amit Kumar Sinha, Bellevue, WA (US); Ethan Joseph Bernstein, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 15/670,785

(22) Filed: Aug. 7, 2017

(65) Prior Publication Data

US 2019/0042605 A1 Feb. 7, 2019

(51) Int. Cl.
*G06F 17/30* (2006.01)
*G06F 16/21* (2019.01)
*H04L 29/08* (2006.01)

(52) U.S. Cl.
CPC .......... *G06F 16/213* (2019.01); *G06F 16/212* (2019.01); *H04L 67/06* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 7,721,138 B1 * | 5/2010 | Lyadvinsky | G06F 11/1417 714/10 |
| 7,861,239 B2 | 12/2010 | Mayfield et al. | |
| 8,065,323 B2 | 11/2011 | Sallakonda et al. | |
| 8,069,218 B1 * | 11/2011 | Tormasov | G06F 9/4856 709/212 |
| 9,244,914 B2 | 1/2016 | Trumbull et al. | |
| 9,361,326 B2 | 6/2016 | Driesen et al. | |
| 9,535,935 B2 | 1/2017 | Doms | |
| 10,185,727 B1 * | 1/2019 | Wilton | G06F 16/214 |

(Continued)

FOREIGN PATENT DOCUMENTS

CN 103905225 A 7/2014

OTHER PUBLICATIONS

"Publish/Restore: How Do I Restore an Earlier Version of My App?", Retrieved from http://interapt.com/faq/togglit-support/publishrestore-how-do-i-restore-earlier-version-my-app, Retrieved on Jun. 19, 2017, 4 pages.

(Continued)

*Primary Examiner* — Hung D Le

(57) ABSTRACT

This disclosure describes converting data from a current data schema to an updated data schema in response to an application being updated. More specifically, this disclosure describes how data stored on computing device can be converted from any previous data schema version to an updated data schema version using a single conversion operation. Additionally, any data and/or content that has already been downloaded and stored on the computing device may be salvaged and associated with the newly converted data. As such, previously downloaded content does not need to be downloaded again when a data schema associated with an application has been updated.

20 Claims, 9 Drawing Sheets

(56) References Cited

U.S. PATENT DOCUMENTS

| | | | |
|---|---|---|---|
| 2004/0194016 A1* | 9/2004 | Liggitt | G06F 17/2247 715/234 |
| 2008/0162494 A1* | 7/2008 | Long | G06F 16/256 |
| 2009/0228527 A1* | 9/2009 | Wang | G06F 3/0617 |
| 2010/0082543 A1* | 4/2010 | Nagarajan | G06F 3/0605 707/640 |
| 2012/0030167 A1 | 2/2012 | Appiah et al. | |

OTHER PUBLICATIONS

"Restoring Previous Versions", Retrieved from http://docs.aws.amazon.com/AmazonS3/latest/dev/RestoringPreviousVersions.html, Retrieved on Jun. 19, 2017, 2 pages.

* cited by examiner

SELECTIVE DATA MIGRATION ON SCHEMA BREAKING CHANGES

BACKGROUND

Applications that execute on a computing device are often updated to provide new functionality, fix bugs, and/or update current features. In some instances, when the application is updated, a data schema associated with the application is also updated. When the data schema is updated, data associated with the application may also need to be updated to conform to the new data schema.

However, in order to update the data to the new data schema, the data storage system is typically taken offline and/or the data in the data storage system may be discarded. In the latter case, data that had already been downloaded and stored in the data storage system may have to be downloaded again. Additionally, if multiple upgrades are available, and if each upgrade updated the data schema, the data must be serially updated (e.g., updated to conform to each data schema associated with each update).

It is with respect to these and other general considerations that examples have been described. Also, although relatively specific problems have been discussed, it should be understood that the examples should not be limited to solving the specific problems identified in the background.

SUMMARY

This disclosure generally relates to converting data from one data schema to another data schema. In some cases, the data may be converted "on the fly" such as, for example, when the application that utilizes the data is being executed by a computing device. Further, a single conversion operation may be used to update multiple changes to a data schema.

For example, when an application executing on computing device is updated, a data schema of data associated with the application may also be updated. However, depending on the frequency of the updates, a user of the application may not have downloaded and/or installed each update. As such, the data schema that is currently in use by the application may be one or two versions behind the updated data schema required by the updated version of the application.

However, the current disclosure describes how data schema upgrades may be performed on data from any previous data schema version to the updated data schema version required by the updated version of the application. In the disclosed examples, the data conversion occurs in a single operation—even if the single operation encompasses multiple data schema changes.

In some instances, the data conversion may occur on the fly (e.g., without taking the database or other storage system offline). In addition, whenever data is converted from one data schema to another, additional data (e.g., user account settings, email attachments, account preferences, favorites etc.) that is associated with the data being converted is simply transferred from the old data store to a data store that is created in response to the new data schema being identified. Thus, data that has already been downloaded, even if it was downloaded and stored with the old data schema, may be salvaged and used with the new data schema without re-downloading the data using the new data schema.

Accordingly, described herein is a method for updating a data schema in response to an application upgrade. This method includes receiving an update for an application executing on a computing device and determining whether the update for the application includes an updated data schema. When it is determined that the update for the application includes the updated data schema, a current version of a data schema used by the application before the application was updated is determined. A determination is also made as to which portions of data in the current version of the data schema need to be updated to comply with the updated data schema. Two or more operations to be performed on the data to convert the data from the current data schema to the updated data schema are also determined. In some examples, each of the two or more operations is associated with different data schemas. Once the two or more operations are determined, the two or more operations are performed in a single conversion operation which changes the data from the current data schema to the updated data schema.

Also described is a computing device that includes a processing unit and a memory for storing instructions that, when executed by the processing unit, perform a method for updating a data schema. In some examples, the method includes determining a current data schema associated with a current version of an application executing on the computing device. When an updated data schema is received, a determination is made as to whether the current data schema is compatible with the updated data schema. When it is determined that the current data schema is not compatible with the updated data schema, two or more operations that will convert the data in the current data schema to the updated data schema are identified. In some cases, the operations are identified based on information associated with the current data schema and the updated data schema. In other examples, each of the two or more operations is associated with different data schemas. The two or more operations are then performed on the data in a single conversion operation which changes the data from the current data schema to the updated data schema.

This disclosure also describes a method for performing a data schema upgrade. In some examples, the method includes determining a current data schema associated with an application executing on a computing device and receiving an updated data schema associated with the application. Once the update is received, a determination is made as to which data in the current data schema is affected by the updated data schema. A new storage area associated with the updated data schema is then generated. A determination may then be made as to two or more operations that will convert the affected data in the current data schema to the updated data schema. The affected data is then migrated to the new storage area. In some example, migrating the affected data to the new storage area includes performing the two or more operations on the affected data in a single conversion operation.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
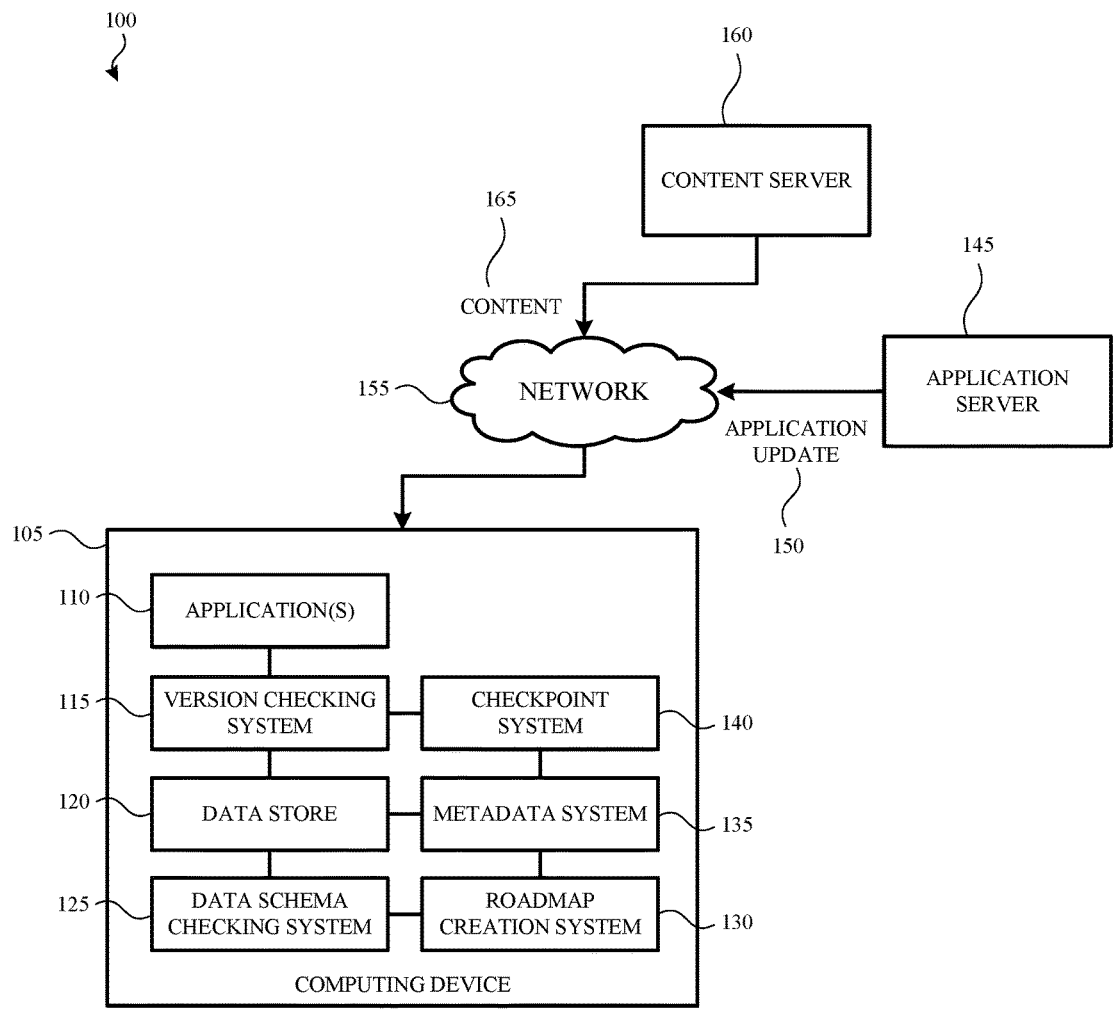
FIG. 1 illustrates a system for performing selective migration of data in response to a data schema change according to an example.
Figure 2:
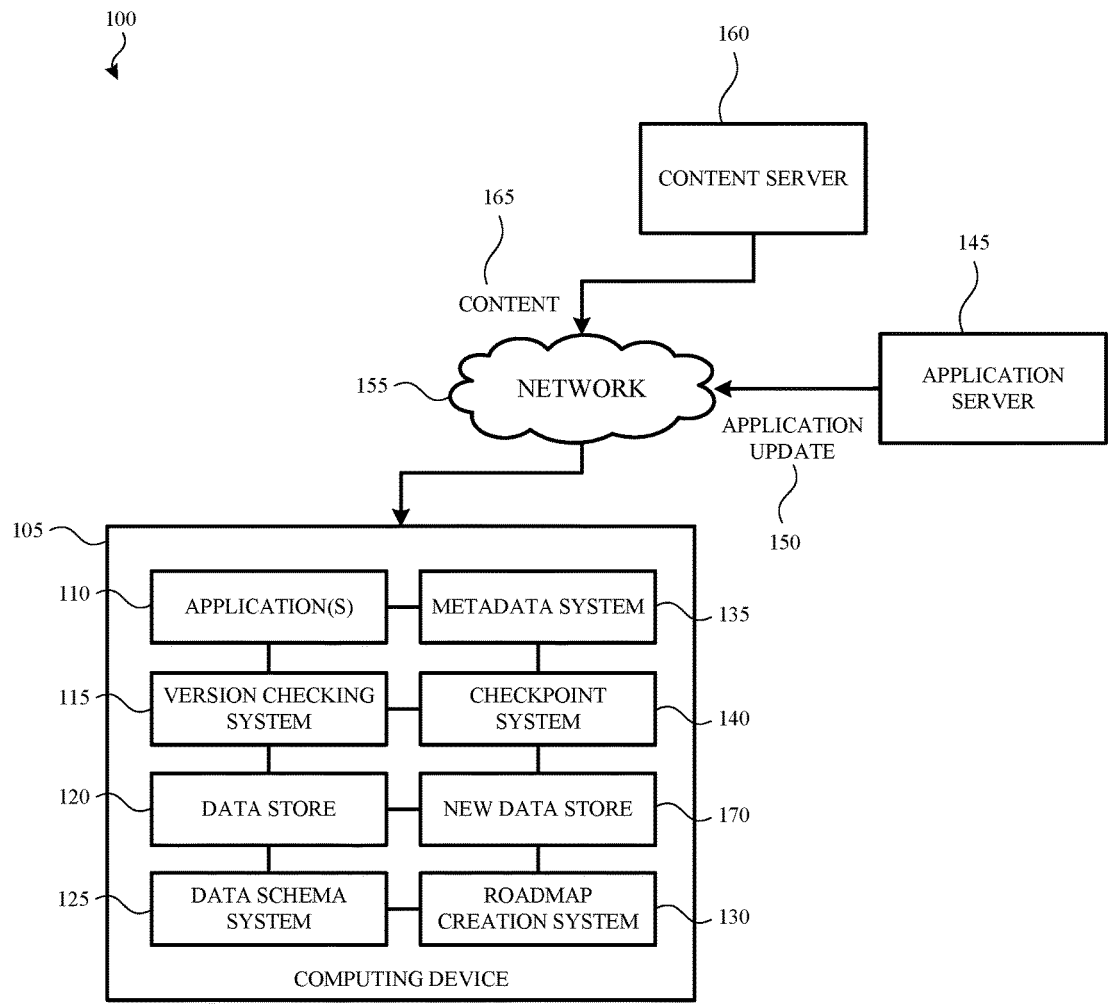
FIG. 2 illustrates the system of FIG. 1 in which an additional data store has been generated according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Described herein is a system and method for performing selective data migration for a schema based storage system that is associated with an application executing on a computing device. In some cases, the application may be an electronic messaging application. As such, the examples described herein may relate to electronic messages, electronic messaging preferences, settings, attachments associated with the electronic messages and so on. However, the concepts described herein may be used by any application that utilizes a schema based data store or other storage device.

As will be described below, the systems and method described herein are directed to performing selective data migration on data that is stored in a current data schema to an updated data schema. As used herein the term "current data schema" means a data schema that is utilized by an application before the application has been updated. As used herein, the term "updated data schema" means a data schema that has been updated in response to an update to the application. For example, in some instances, when an application is updated (e.g., a new version of an application is released, one or more bug fixes is released, etc.) the update to the application may also include an update to an associated data schema. Thus, any data that will be utilized by the updated application will need to conform to the updated data schema.

However, in some instances, the current data schema may be two or more versions behind the updated data schema. For example, a user of the computing device on which the application is executing may not have updated the application each time an update to the application was released or otherwise made available.

However, the systems and method described herein enable a single upgrade operation to be performed on the current data schema and/or its associated data regardless of how many different data schema conversion operations are required to convert the current data schema to the updated data schema. That is, the system and methods described herein enable data schemas to be updated from any previous data schema version (N-n) to the updated data schema in a single conversion operation.

For example, as an application and/or its associated a data schema is updated, one or more operations that are required to be performed on the data schema are defined and stored. As such, a roadmap of operations from one data schema to another data schema may be created. When an application is ultimately updated, the defined operations in the roadmap are used to perform an in-place, single operation upgrade of the data and the current data schema.

The methods and system described herein are in contrast to previous solutions in which data schema updates occur from only from an immediately previous version of a data schema. That is, when an update to an application causes a schema break, current solutions typically only provide an upgrade path from version N−1 of the data schema to the N version of the data schema. Thus, if an application is not regularly updated (e.g., the data schema for an application has undergone multiple data schema changes but the application on the computing device has not been updated and those changes have not been applied), the application may have to undergo multiple rounds of upgrades before the current data schema version is available on the computing device.

These and other examples will be described in more detail below with respect to FIGS. 1-4.

FIG. 1 illustrates a system 100 for performing selective migration of data in response to a data schema change according to an example. In some examples, the system 100 may include a computing device 105. The computing device 105 may be any device capable of executing one or more applications 110. For example, the computing device 105 may be a mobile telephone, a tablet computing device, a laptop computer, a desktop computer, a gaming device, a wearable electronic device and so on.

The computing device 105 may also be capable of downloading applications 110 and/or application updates 150 from an application server 145 over a network 155. The application server 145 may provide any number of applications 110 to the computing device 105. The computing device 105 may also receive content 165 from a content server 160 over the network 155. The content 165 may be associated with or otherwise used by the applications 110 executing on the computing device 105.

In one example, the application 110 may be an electronic messaging application, such as, for example, an email application. As such, the content 165 that is received from the content server 160 may be an electronic message. In some examples, the content 165 may include one or more attachments, electronic message bodies and so on.

As shown in FIG. 1, the computing device 105 may also include a number of different systems. In some examples, the systems include a version checking system 115 that determines a version of one or more applications 110 executing on the computing device 105, a data store 120 that stores data and/or content 165 received by or otherwise associated with the applications 110, a data schema checking system 125 that determines a data schema utilized by the data store 120 and/or a data schema utilized by an application 110 or by an updated application, a roadmap creation system 130 that tracks or otherwise determines operations that need to be performed on data and/or on the current data schema to update the current data schema of the data store 120 to the updated data schema, a metadata system 135 that stores metadata about the content 165 or other data stored in the data store 120 and a checkpoint system 140 that generates one or more checkpoints that tracks the status of the data conversion operations.

Although each of these systems are shown separately, one or more of these systems may be combined. Further, each of the systems may share information, data, and/or content with each of the other systems. As will be explained below, each of these systems work together to ensure that data stored in a current data schema may be updated in a single operation to conform with an updated data schema utilized by an application once the application been updated—regardless of how many updates have occurred between the current data schema and the updated data schema.

For example, in some cases, updates for applications 110 executing on a computing device may be periodically released. Typically, it is up to a user of the application 110 to download the application update 150 from the application server 145. However, a user of the computing device 105 may have skipped or simply not updated an application 110 for a number of days, weeks, or months. During that time, multiple different updates may have been released or otherwise made available on the application server 145.

In some cases, each of the multiple different application updates 150 may change a data schema of data that is associated with or otherwise used by the application 110. As such, when the application 110 is updated, any data or other content that is stored in the data store 120 may need to be updated to conform to the updated data schema.

The following example illustrates how a data schema, and its associated data, may be updated from a current data schema (e.g., an N-n data schema version) to an updated data schema version utilized by an application 110. In some cases, the examples that follow may be used when an existing application 110 is updated to the most current release. In other example, the description below may be used when an application 110 is installed on the computing device 105.

Typically, when content 165 is received by the computing device 105, it is stored in the data store 120. As discussed above, the data store 120 may be associated with or otherwise utilize a particular data schema. In the examples described herein, the data schema that is used by an application 110 prior to it being updated is referred to as the current data schema. In some instances, the data schema of the data store 120 may be associated with a particular application 110. That is, when an application 110 receives content 165 from the content server 160, the content 165 is stored in the data store 120 and may have a particular form, shape, format etc.

When an application update 150 is received, the computing device 105 may install the update. In some examples, the version checking system 115 may determine which version of the application 110 the computing device 105 is currently executing (e.g., which version the computing device 105 is executing before the application update 150 is received and/or installed, referred to herein as the current version of the application). The version checking system 115 may also determine which version of the application will be executing on the computing device 105 after the application update 150 is received and installed (referred to herein as the updated version of the application).

In some instances, the current version of the application has a current data schema and is associated with the data store 120. Likewise, and as discussed above, the updated version of the application may also be associated with an updated data schema. As will be explained below, the updated version of the application may also be associated with a new data store (e.g., new data store 170 (FIG. 2)). In addition to determining each item of information just described, the version checking system 115 may also be configured to determine the current version of the application that created the data store 120.

In some cases, when an application update 150 is received and the application update 150 includes an updated data schema, one or more portions of data stored in the data store 120 may need to be converted from the current data schema to the updated data schema. For example, in the current data schema, a particular setting for the application 110 may be stored as a float. However, in the updated data schema, the particular setting for the updated application may be stored as a Boolean. Thus, this portion of the data may need to be converted and migrated to a new data store that is associated with the updated application. Although a specific example is given, this is only an example and should not be construed as limiting.

In some cases, not all of the data in the data store 120 needs to be converted when an updated data schema is received. For example, the data schema checking system 125 may analyze the data in the data store 120 and determine, based on information associated with the application update 150, which portions of stored data should be converted from the current data schema to the updated data schema.

Continuing with the example above, the particular setting for the application 110 (e.g., the text characteristics of an unread message) may change from being stored as a float in the current data schema to being stored as a Boolean in the updated data schema. However, a different setting (e.g., the color of a flagged message) may remain unchanged (e.g., the color of the flagged message may be stored as an integer in the current data schema and in the updated data schema). In this instance, the only data that is updated to conform to the updated data schema and migrated to a new data store is the data that corresponds to the text characteristics of the unread message (e.g., the data that was originally represented as the float and changed to a Boolean). In other cases all data is migrated from the old data store 120 to the new data store. However, in such cases, data that needs to be converted to the new data schema takes priority over data that simply needs to be migrated.

Once it is determined which data in the data store 120 should be updated, a roadmap creation system 130 determines which operations are needed to convert the data from the current data schema to the updated data schema. The roadmap creation system 130 may also generate a new data store 170 shown in FIG. 2.

In some examples, the new data store 170 is created based on the updated data schema. Any data in the data store 120 that does not conform to the updated data schema is migrated to the new data store. During the migration process, one or more operations are performed on the data to ensure the data conforms to the updated data schema. As will be described in more detail below, the one or more operations are combined into a single conversion operation. Further, the data conversion is done in real time or substantially real time without taking the data store 120 or the new data store 170 offline. Additionally, and regardless of how many operations are needed to complete the conversion, each operation is combined into a single conversion operation thereby eliminating the need to perform individual serial updates to the data.

For example, in some instances, the roadmap creation system 130 has access to one or more upgrade definitions that are associated with an application update 150. Each upgrade definition may be associated with a schema update.

Thus, if the most recent version of an application is version 10, but the computing device 105 is currently executing version 5 (and one or more of versions 6, 7, 8, and 9 include some type of data schema update) the roadmap creation system 130 is able to backtrack from version 10 to version 5 and determine the operations that resulted in the data schema update for that particular version. For example, a data schema update from version 5 to version 6 may have required that a value of the data was multiplied by five. The data may have remained unchanged from version 6 to version 7. However, in version 8, the data may have changed from being represented as an integer to being represented as a float. This data may have remained unchanged in version 9. However, in version 10, the data schema may require that the data be represented as a real instead of a float.

In this example, the roadmap creation system 130 may receive (e.g., from the application server 145) or may otherwise determine (based on information included in the application update) definitions of each of the operations described above. As such, the roadmap creation system 130 generates a single conversion operation that includes each of the operations (e.g., an operation that includes the data being multiplied by 5, the conversion of the data from an integer to a float and from the float to a real). The single conversion operation is then performed on the data as it is moved from the data store 120 to the new data store 170.

In some instances, although a new data store 170 is created, the original data store 120, and its associated data, is also maintained. In some cases, the data store 120 may be maintained as long as it stores data associated with the application. In other examples, once the data that does not conform to the updated data schema has been converted (e.g., by the single conversion operation) and migrated to the new data store 170, the non-affected data (e.g., the data that was not affected by the updated data schema) may be migrated to the new data store 170. In some instances, this data migration may be done in the background and/or when the computing device is in a standby mode, is charging or is otherwise not in use. As such, the data migration may be transparent to the user. Once all of the data has been migrated from the data store 120 to the new data store 170, the data store 120 may be deleted.

The system 100 also includes a checkpoint system 140. The checkpoint system 140 generates one or more checkpoints associated with migrating data. For example, multiple checkpoints may be created based on a total size of data migration. Thus, if a data migration is interrupted (e.g., the computing device exits standby mode, the computing device 105 shuts down etc.), the checkpoints may be used to indicate which data has been converted and/or migrated and where the data conversion/migration should resume.

Performing the single conversion operation and the data migration such as described enables content 165 and other data that has already been downloaded and stored to be salvaged. For example, if the application is an email application and has 100 stored messages that are affected by the updated data schema, the data associated with the 100 stored messages may be converted on the fly and stored in the new data store without requiring the 100 messages to be downloaded a second time so that they conform with the updated data schema.

As also shown, the computing device 105 may include a metadata system 135. The metadata system 135 may be used to associate additional data and/or content with the data that was converted and/or migrated. For example, the converted data may be an email message with an attachment. The metadata system 135 may be able to determine, based on metadata associated with the converted data and/or the attachment, that the attachment was included with the data before the data was converted. Thus, as the attachment is migrated from the data store 120 to the new data store 170, the attachment will be associated with the converted/migrated email message without having to re-download the attachment or the email message.

In some cases, certain portions of data may be re-downloaded from the content server 160. However, if the certain portions of content included additional data (e.g., attachments), the additional content is maintained in the data store 120. As such, the metadata associated with the certain portions of content and/or the additional content, may be used to re-associated the additional content with the certain portions of content. This may occur even if the certain portions of data are downloaded and stored in the new data store 170 and the additional content is stored in the data store 120.

For example, the certain portions of content may be an email message that originally included an attached file. The attached file may be stored in the data store. However, the email message may be re-downloaded from the content server 160 in response to a data schema change. However, instead of re-downloading the email message and the attachment, the email message is downloaded. Once the email message is downloaded, metadata associated with the email message and/or the attached file indicates that the two files are associated with each other. As such, the attached file that is stored in the data store 120 may be migrated to the new data store 170 and stored with the email message.

Although a specific example was given, this should not be construed as limiting. In other examples, user settings, page views, favorites, account settings and the like may all be migrated from the data store 120 to the new data store using metadata information determined by the metadata system 135.

Figure 3:
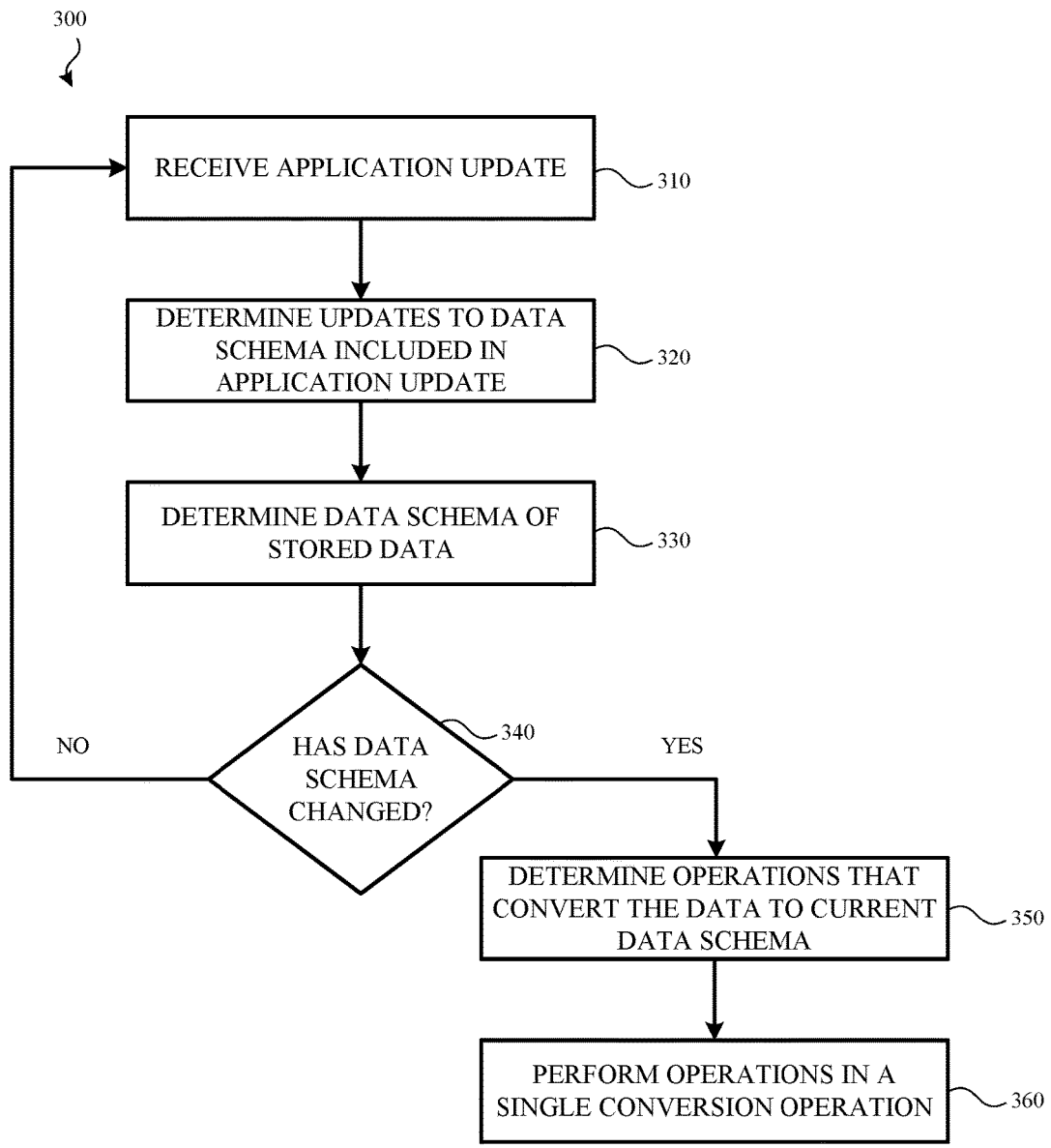
FIG. 3 illustrates a method for updating data from a first data schema to a current data schema according to an example.

FIG. 3 illustrates a method 300 for updating data from a first data schema to a current data schema according to an example. In some implementations, the method 300 may be utilized by a system such as, for example, system 100, shown and described by FIG. 1. In some examples, the method 300 may be utilized by the computing device 105 shown and described in FIG. 1.

Method 300 begins at operation 310 in which an update to an application is received by a computing device. In some examples, the update may be provided by an application server or other remote computing device. Although an update to an application is specifically mentioned, the examples described herein may also apply to a newly installed application and/or an application that is reinstalled on the computing device.

In some examples, the application is any application that stores or otherwise accesses content. In one specific yet non-limiting example, the application is an electronic messaging application, such as, for example, an email application. As previously discussed, the application may be associated with a version number. As the application is updated, the version number may change. In some examples, when the application is installed on the computing device, one or more data stores may also be created. The data stores may be associated with a data schema that describes the shape, format, data hierarchy and so on.

However, when an update to an application is received, the data schema associated with the application may also be updated. As such, flow proceeds to operation 320 in which a determination is made as to whether the application update includes any updates to an associated data schema. In some examples, the application update may include one or more operation definitions that describe how data in a current data schema is converted to the updated data schema.

Flow then proceeds to operation 330 in which a current data schema of stored data is determined. For example, data associated with the current version of the application (e.g., the version of the application that was executing on the computing device before the application update was received) is analyzed to determine the current data schema associated with the data.

In operation 340 a determination is made as to whether the data schema has changed. In some examples, this determination is made based, at least in part, on requests for data made by the updated application. For example, if the application is updated, and during the update process the application requests data that cannot be found in the desired format (e.g., the desired data schema), a search is performed on the data store associated with the current version to find data that can be converted to the updated data schema and migrated to a newly generated data store.

If the data schema has not changed, flow returns to operation 310. However, if it is determined in operation 340 that the data schema has changed, flow proceeds to operation 350 and a determination is made as to which operations need to be performed on the data associated with the current data schema to convert it to the updated data schema. In some examples, operation 350 not only determines which portions of data are to be updated, but also determines which operations are to be performed on the data.

For example, in some instances, an application update may include multiple different data schema updates. For example, if a user has not updated an application each time an update is available, a single application update may include each of the previous updates (e.g., a single application update may include an update from version 1 to version 3).

Additionally, each data schema update may be applied to different portions of data. For example, an application update from version 1 to version 2 may affect a first portion of data while an application update from version 2 to version 3 may affect a second, different portion of data. In another example, an application update from version 1 to version 2 may affect a first portion of data while an application update from version 2 to version 3 may also affect the first portion of the data. In yet another example, an application update from version 1 to version 2 may affect a first portion of data while an application update from version 2 to version 3 may affect the first portion of the data and a second, different portion of data.

Regardless of which portions of data are affected by the data schema changes, operation 350 provides that the various data schema operations are determined for each of the application updates. In some example, the schema operations are included in information about the application update. In other examples, a roadmap creation system (e.g., roadmap creation system 130 of FIG. 1) may determine which operations are needed to convert the data from the current data schema to the updated data schema. In some instances, this is accomplished by tracing the data schema updates from the updated data schema back to the current data schema.

Once the operations are determined, flow proceeds to operation 360 and each of the operations that were determined in operation 350 and combined into a single conversion operation and performed on the data. In some cases, once an update to an application is received, a new data store is created. Thus, as the data is being converted from the current data schema to the updated data schema, the data that is being converted is migrated from the data store associated with the current version of the application to the new data store associated with the updated version of the application.

In some instances, the conversion operation and the migration of the data from the data store associated with the current version of the application to the new data store associated with the updated version of the application is done while the application is being updated or is otherwise being executed. As such, there is no need to take the data store offline. In some instances, the data conversion operations and migration may be completed when the computing device is in a standby mode, a sleep mode or is otherwise not being used by the user.

Figure 4:
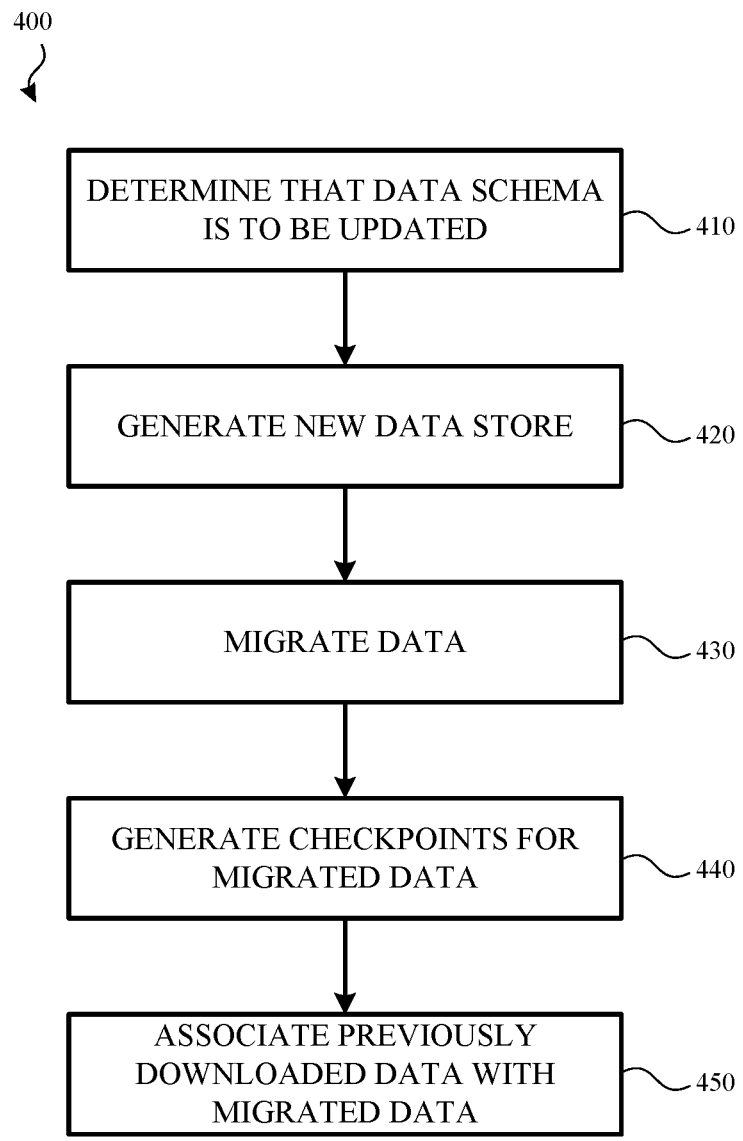
FIG. 4 illustrates a method for performing a selective data migration in response to a data schema being updated according to an example.

FIG. 4 illustrates a method 400 for performing a selective data migration in response to a data schema being updated according to an example. In some examples, the method 400 may be used by the system 100 shown and described above with respect to FIG. 1. For example, the method 400 may be used by the computing device 105 described with respect to FIG. 1.

Method 400 begins at operation 410 in which a determination is made that a data schema associated with data stored in a data store needs to be updated. In some examples, the determination of whether the data schema of the data needs to be updated is based, at least in part, on a received update to an application. In some examples and as described above, a single update to an application may include multiple different data schema updates that affect the same portions of the data stored in a data store, different portions of the data stored in the data store or all of the data stored in the data store.

Flow then proceeds to operation 420 and a new data store is generated. In some examples, the new data store has a data schema that is specified by the updated application. In some examples, the new data schema may change the form, format, type, structure, hierarchy and so on of different portions of stored data or all of the stored data.

Once the data store is generated, flow proceeds to operation 430 and select portions of the data are migrated from the data store to the newly created data store. In some examples, the data that is migrated from the data store to the newly created data store includes that data that is affected by the updated data schema. As discussed above, as the data is migrated, one more data schema operations that have been combined into a single conversion operation may be performed on the data. Thus, instead of perform two different conversion operations on data if the updates were downloaded and applied to the data separately, the single conversion operation encompasses both updates and both updates are applied in a single operation.

As the data is being migrated, flow may proceed to operation 440 and one or more checkpoints for migrated data are generated. In some examples, the checkpoints are used to determine which portions of the data have been converted using the single conversion operation and/or which portions of the data have been migrated from the data store to the new data store. Thus, if the migrations and/or conversions operations are interrupted, the data migration and conversion operations may resume at the latest checkpoint.

Flow may also proceed to operation 450 in which data that has already been downloaded may be associated with the migrated data. For example, a portion of migrated data may correspond to an electronic message. Additionally, the electronic message may have included an attachment that was already downloaded by the computing device. In previous solutions, the attachment would need to be re-downloaded with the message when the data schema was updated. However, using the current system and method, data that was previously downloaded may be associated with its corresponding data once the corresponding data has been migrated from the old data store and/or re-downloaded from a content server.

For example, metadata associated with the downloaded data and/or the migrated data may be analyzed to determine which previously downloaded or stored content should also be migrated from the old data store to the new data store. Once this determination is made, the previously downloaded data may be migrated to the new data store and re-associated with the converted data and/or the re-downloaded data. As such, the previously downloaded data does not need to be re-downloaded from a server which frees up bandwidth and processing power of the computing device.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of electronic device configurations that may be utilized for practicing aspects of the disclosure, as described herein.

Figure 5:
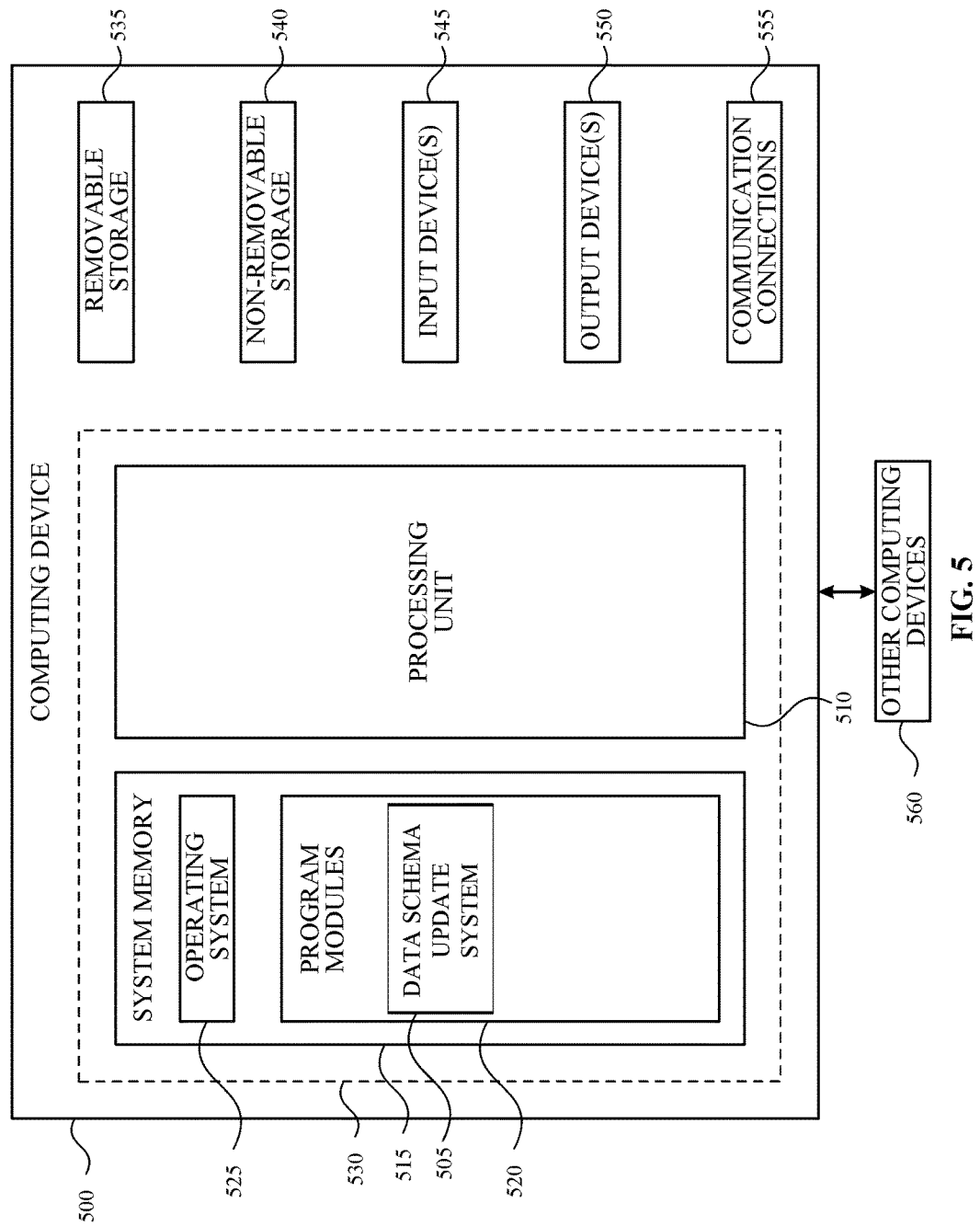
FIG. 5 is a block diagram illustrating example physical components of a computing device with which aspects of the disclosure may be practiced.

FIG. 5 is a block diagram illustrating physical components (e.g., hardware) of an electronic device 500 with which aspects of the disclosure may be practiced. The electronic device 500 may be similar to the computing device 105 described above with respect to FIG. 1. The components of the electronic device 500 described below may have computer executable instructions for performing data schema conversions such as described above.

In a basic configuration, the electronic device 500 may include at least one processing unit 510 and a system memory 515. Depending on the configuration and type of electronic device, the system memory 515 may comprise, but is not limited to, volatile storage (e.g., random access memory), non-volatile storage (e.g., read-only memory), flash memory, or any combination of such memories. The system memory 515 may include an operating system 525 and one or more program modules 520 or components suitable for identifying various objects contained within captured images such as described herein.

The operating system 525, for example, may be suitable for controlling the operation of the electronic device 500. Furthermore, examples of the disclosure may be practiced in conjunction with a graphics library, other operating systems, or any other application program and is not limited to any particular application or system. This basic configuration is illustrated in FIG. 5 by those components within a dashed line 530.

The electronic device 500 may have additional features or functionality. For example, the electronic device 500 may also include additional data storage devices (removable and/or non-removable) such as, for example, magnetic disks, optical disks, or tape. Such additional storage is illustrated in FIG. 5 by a removable storage device 535 and a non-removable storage device 540.

As stated above, a number of program modules and data files may be stored in the system memory 515. While executing on the processing unit 510, the program modules 520 (e.g., a data schema update system 505 that may include one or more of the various systems described above with respect to FIG. 1) may perform processes including, but not limited to, the aspects, as described herein.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 500 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general purpose computer or in any other circuits or systems.

The electronic device 500 may also have one or more input device(s) 545 such as a keyboard, a trackpad, a mouse, a pen, a sound or voice input device, a touch, force and/or swipe input device, etc. The output device(s) 550 such as a display, speakers, a printer, etc. may also be included. The aforementioned devices are examples and others may be used. The electronic device 500 may include one or more communication connections 555 allowing communications with other electronic devices 560. Examples of suitable communication connections 555 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 515, the removable storage device 535, and the non-removable storage device 540 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 500. Any such computer storage media may be part of the electronic device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
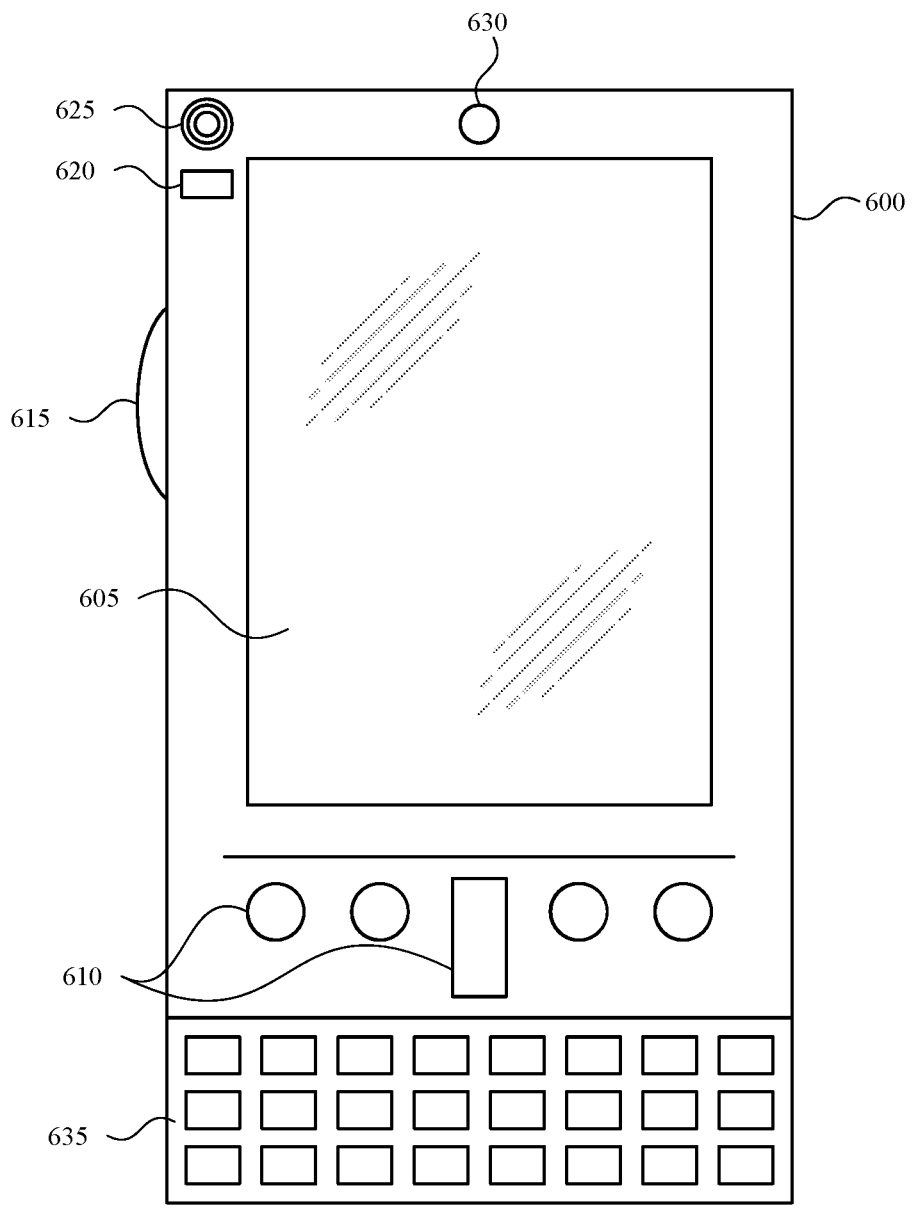
FIGS. 6A and 6B are simplified block diagrams of a mobile computing device with which aspects of the present disclosure may be practiced.
Figure 6B:
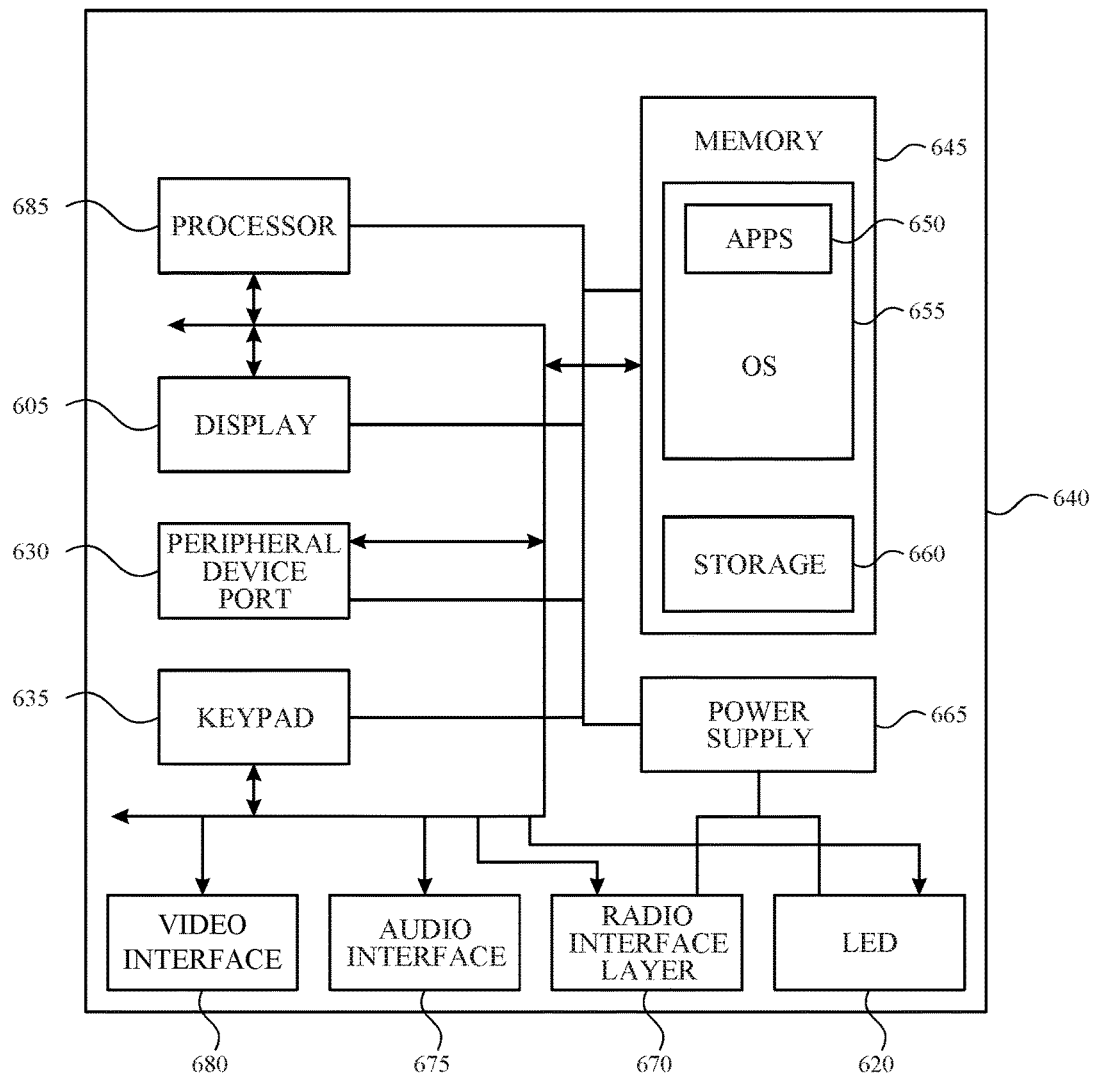

FIGS. 6A and 6B illustrate a mobile electronic device 600, for example, a mobile telephone, a smart phone, wearable computing device (such as a smart watch), a tablet computer, a laptop computer, and the like, with which examples of the disclosure may be practiced. With reference to FIG. 6A, one aspect of a mobile electronic device 600 for implementing the aspects of the present disclosure is illustrated.

In a basic configuration, the mobile electronic device 600 is a handheld computer having both input elements and output elements. The mobile electronic device 600 typically includes a display 605 and one or more input buttons 610 that allow the user to enter information into the mobile electronic device 600. The display 605 of the mobile electronic device 600 may also function as an input device (e.g., a display that accepts touch and/or force input).

If included, an optional side input element 615 allows further user input. The side input element 615 may be a rotary switch, a button, or any other type of manual input element. In alternative aspects, mobile electronic device 600 may incorporate more or less input elements. For example, the display 605 may not be a touch screen in some examples. In yet another alternative embodiment, the mobile electronic device 600 is a portable phone system, such as a cellular phone. The mobile electronic device 600 may also include an optional keypad 635. Optional keypad 635 may be a physical keypad or a "soft" keypad generated on the touch screen display.

In various examples, the output elements include the display 605 for showing a graphical user interface (GUI), a visual indicator 620 (e.g., a light emitting diode), and/or an audio transducer 625 (e.g., a speaker). In some aspects, the mobile electronic device 600 incorporates a vibration transducer for providing the user with tactile feedback. In yet another aspect, the mobile electronic device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile electronic device 600. That is, the mobile electronic device 600 can incorporate a system (e.g., an architecture) 640 to implement some aspects. In one embodiment, the system 640 is implemented as a "smart phone" capable of running one or more applications (e.g., browser, e-mail, calendaring, contact managers, messaging clients, games, media clients/players, content selection and sharing applications and so on). In some aspects, the system 640 is integrated as an electronic device, such as an integrated personal digital assistant (PDA) and wireless phone.

One or more application programs 650 may be loaded into the memory 645 and run on or in association with the operating system 655. Examples of the application programs include phone dialer programs, e-mail programs, personal information management (PIM) programs, word processing programs, spreadsheet programs, Internet browser programs, messaging programs, and so forth.

The system 640 also includes a non-volatile storage area 660 within the memory 645. The non-volatile storage area 660 may be used to store persistent information that should not be lost if the system 640 is powered down.

The application programs 650 may use and store information in the non-volatile storage area 660, such as email or other messages used by an email application, and the like. A synchronization application (not shown) also resides on the system 640 and is programmed to interact with a corresponding synchronization application resident on a host computer to keep the information stored in the non-volatile storage area 660 synchronized with corresponding information stored at the host computer.

The system 640 has a power supply 665, which may be implemented as one or more batteries. The power supply 665 may further include an external power source, such as an AC adapter or a powered docking cradle that supplements or recharges the batteries.

The system 640 may also include a radio interface layer 670 that performs the function of transmitting and receiving radio frequency communications. The radio interface layer 670 facilitates wireless connectivity between the system 640 and the "outside world," via a communications carrier or service provider. Transmissions to and from the radio interface layer 670 are conducted under control of the operating system 655. In other words, communications received by the radio interface layer 670 may be disseminated to the application programs 650 via the operating system 655, and vice versa.

The visual indicator 620 may be used to provide visual notifications, and/or an audio interface 675 may be used for producing audible notifications via an audio transducer (e.g., audio transducer 625 illustrated in FIG. 6A). In the illustrated embodiment, the visual indicator 620 is a light emitting diode (LED) and the audio transducer 625 may be a speaker. These devices may be directly coupled to the power supply 665 so that when activated, they remain on for a duration dictated by the notification mechanism even though the processor 685 and other components might shut down for conserving battery power. The LED may be programmed to remain on indefinitely until the user takes action to indicate the powered-on status of the device.

The audio interface 675 is used to provide audible signals to and receive audible signals from the user (e.g., voice input such as described above). For example, in addition to being coupled to the audio transducer 625, the audio interface 675 may also be coupled to a microphone to receive audible input, such as to facilitate a telephone conversation. In accordance with examples of the present disclosure, the microphone may also serve as an audio sensor to facilitate control of notifications, as will be described below.

The system 640 may further include a video interface 680 that enables an operation of peripheral device 630 (e.g., on-board camera) to record still images, video stream, and the like.

A mobile electronic device 600 implementing the system 640 may have additional features or functionality. For example, the mobile electronic device 600 may also include additional data storage devices (removable and/or non-removable) such as, magnetic disks, optical disks, or tape. Such additional storage is illustrated in FIG. 6B by the non-volatile storage area 660.

Data/information generated or captured by the mobile electronic device 600 and stored via the system 640 may be stored locally on the mobile electronic device 600, as described above, or the data may be stored on any number of storage media that may be accessed by the device via the radio interface layer 670 or via a wired connection between the mobile electronic device 600 and a separate electronic device associated with the mobile electronic device 600, for example, a server computer in a distributed computing network, such as the Internet. As should be appreciated such data/information may be accessed via the mobile electronic device 600 via the radio interface layer 670 or via a distributed computing network. Similarly, such data/information may be readily transferred between electronic devices for storage and use according to well-known data/information transfer and storage means, including electronic mail and collaborative data/information sharing systems.

As should be appreciated, FIG. 6A and FIG. 6B are described for purposes of illustrating the present methods and systems and is not intended to limit the disclosure to a particular sequence of steps or a particular combination of hardware or software components.

Figure 7:
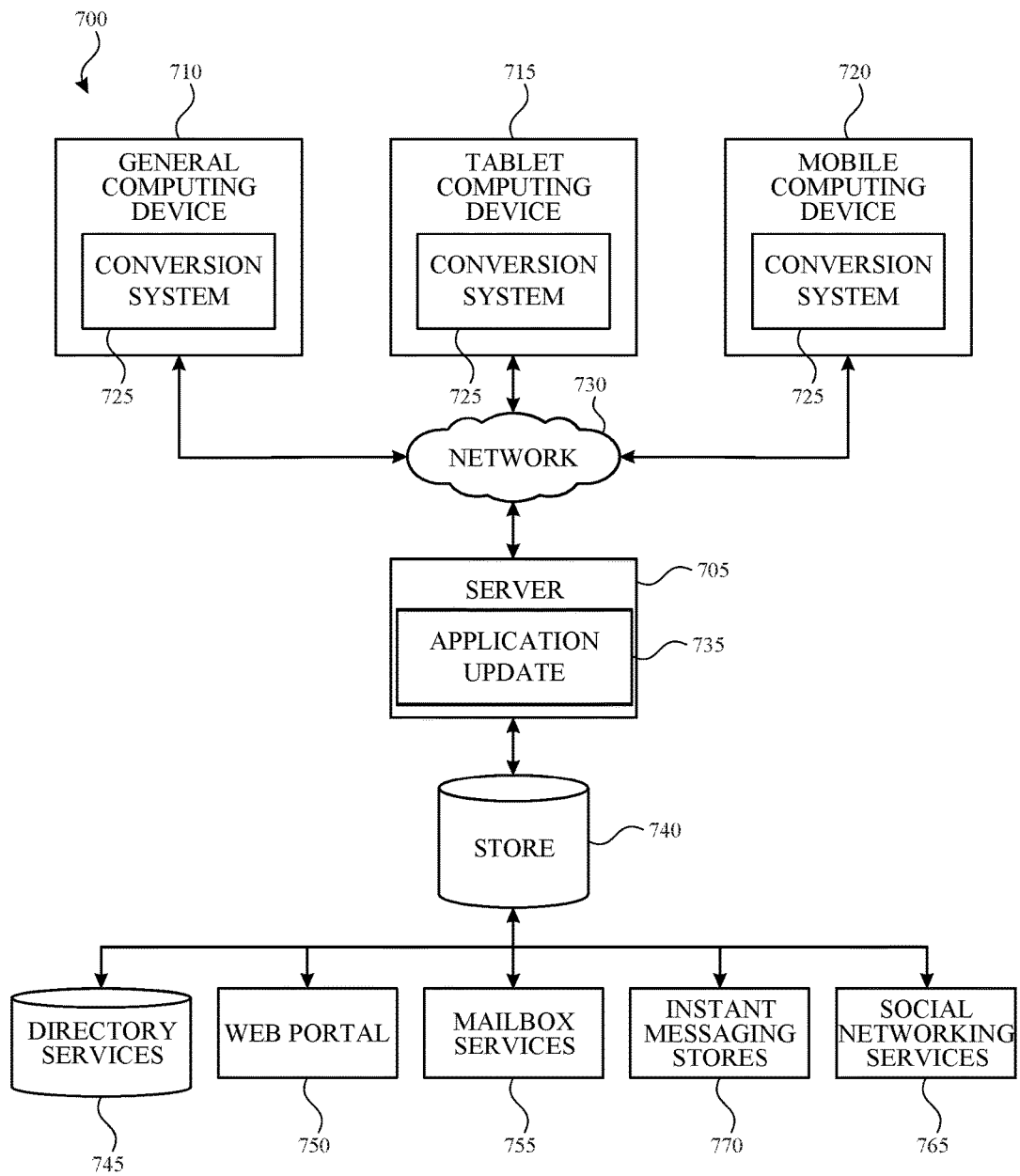
FIG. 7 is a simplified block diagram of a distributed computing system in which aspects of the present disclosure may be practiced.

FIG. 7 illustrates one aspect of the architecture of a system 700 for converting data from a current data schema to an updated data schema such as described herein. The system 700 may include a general computing device 710 (e.g., personal computer), tablet computing device 715, or mobile computing device 720, as described above. Each of these devices may include, be a part of or otherwise be associated with a conversion system such as described herein.

In some aspects, each of the general computing device 710 (e.g., personal computer), tablet computing device 715, or mobile computing device 720 may receive various other types of information or content that is stored by or transmitted from a directory service 745, a web portal 750, mailbox services 755, instant messaging stores 760, or social networking services 765.

In aspects, each of the computing devices described above may execute one or more applications. The applications may be updated using an application update 735 stored on a server 705. The application update 735 may be provided to each of the computing devices over a network 730.

By way of example, the aspects described above may be embodied in a general computing device 710, a tablet computing device 715 and/or a mobile computing device 720. Any of these examples of the electronic devices may obtain content from or provide data to the store 740.

As should be appreciated, FIG. 7 is described for purposes of illustrating the present methods and systems and is not intended to limit the disclosure to a particular sequence of steps or a particular combination of hardware or software components.

Figure 8:
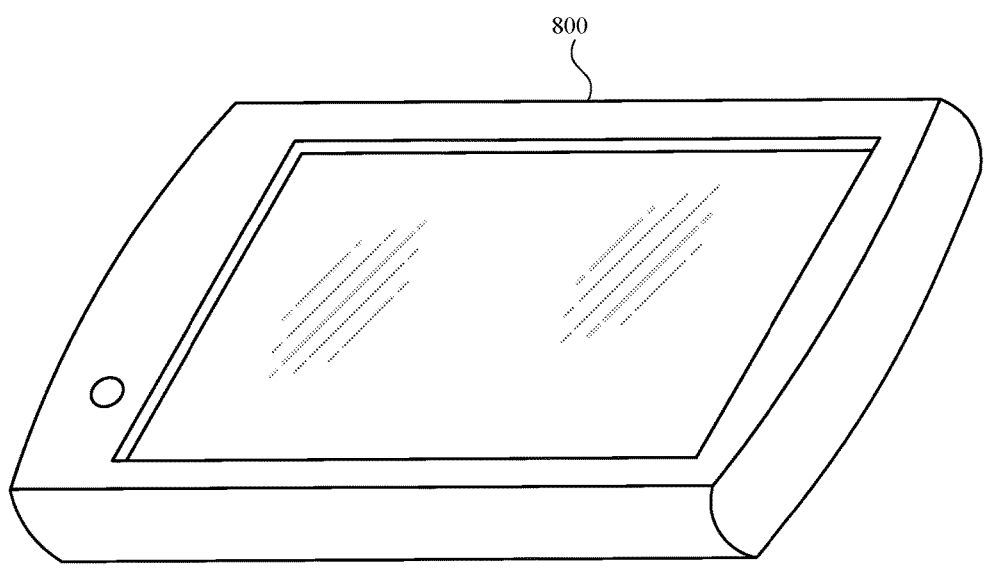
FIG. 8 illustrates a tablet computing device for executing one or more aspects of the present disclosure.

FIG. 8 illustrates an example tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board electronic device displays or via remote display units associated with one or more electronic devices. For example, user interfaces and information of various types may be displayed and interacted with on a wall surface onto which user interfaces and information of various types are projected. Interaction with the multitude of computing systems with which examples of the invention may be practiced include, keystroke entry, touch screen entry, voice or other audio entry, gesture entry where an associated electronic device is equipped with detection (e.g., camera) functionality for capturing and interpreting user gestures for controlling the functionality of the electronic device, and the like.

As should be appreciated, the figures herein FIG. 8 is described for purposes of illustrating the present methods and systems and is not intended to limit the disclosure to a particular sequence of steps or a particular combination of hardware or software components.

Aspects of the present disclosure provide a method, comprising: receiving an update for an application executing on a computing device; determining whether the update for the application includes an updated data schema; and when it is determined that the update for the application includes the updated data schema: determining a current version of a data schema used by the application before the application was updated; determining which portions of data in the current version of the data schema are to be updated to comply with the updated data schema; determining two or more operations to be performed on the data to convert the data from the current data schema to the updated data schema, wherein each of the two or more operations are associated with different data schemas; and performing the two or more operations on the data in a single conversion operation to change the data from the current data schema to the updated data schema. In some aspects, the method further comprises accessing metadata associated with the data to determine content that is associated with the data. In some aspects, the content includes downloaded content associated with the data. In some aspects, determining two or more operations to be performed on the data comprises tracking data schema changes from the current data schema to the updated data schema. In some aspects, the method further comprises generating an operation roadmap that includes the data schema changes from the current data schema to the updated data schema. In some aspects, the method further comprises generating a new data store associated with the updated data schema. In some aspects, the method further comprises migrating the data to the new data store. In some aspects, the method further comprises generating one or more checkpoints as the data is migrated to the new data store. In some aspects, the method further comprises using at least one of the one or more checkpoints to resume data migration at a particular point when data migration is interrupted.

The present disclosure also describes a computing device, comprising: a processing unit; and a memory for storing instructions that, when executed by the processing unit, performs a method, comprising: determining a current data schema associated with a current version of an application executing on the computing device; receiving an updated data schema; determining whether the current data schema is compatible with the updated data schema; and when it is determined that the current data schema is not compatible with the updated data schema: determining, based on information associated with the current data schema and the updated data schema, two or more operations that will convert the data in the current data schema to the updated data schema, wherein each of the two or more operations are associated with different data schemas; and performing the two or more operations on the data in a single conversion operation to change the data from the current data schema to the updated data schema. In some aspects, the memory also stores instructions for generating a data store associated with the updated data schema. In some aspects, the memory also stores instructions for migrating the data to the data store. In some aspects, the memory also stores instructions for generating one or more checkpoints for the migrated data that indicate a progress of data that has been migrated to the data store. In some aspects, the data is previously downloaded content. In some aspects, the determining, based on information associated with the current data schema and the updated data schema, two or more operations that will convert the data in the current data schema to the updated data schema comprises tracking data schema changes from the current data schema to the updated data schema. In some aspects, the memory also stores instructions for generating an operation roadmap that includes the data schema changes from the current data schema to the updated data schema.

Also described is a method, comprising: determining a current data schema associated with an application executing on a computing device; receiving an updated data schema associated with the application; determining which data in the current data schema is affected by the updated data schema; generating a new storage area associated with the updated data schema; determining two or more operations that will convert the affected data in the current data schema to the updated data schema; and migrating the affected data to the new storage area, wherein migrating the affected data to the new storage area comprises performing the two or more operations on the affected data in a single conversion operation. In some aspects, the method further comprises generating one or more checkpoints for the migrated data that indicate a progress of data that has been migrated to the data store. In some aspects, the updated data schema is received with an update to the application. In some aspects, the non-affected data is stored in a data store associated with the current data schema.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
    receiving an update for an application executing on a computing device;
    determining whether the update for the application includes an updated data schema; and
    when it is determined that the update for the application includes the updated data schema:
        determining a current version of a data schema used by the application before the application was updated;
        determining which portions of data in the current version of the data schema are to be updated to comply with the updated data schema;
        determining two or more operations to be performed on the data to convert the data from the current data schema to the updated data schema, wherein each of the two or more operations are associated with different data schemas; and
        performing the two or more operations on the data in a single conversion operation to change the data from the current data schema to the updated data schema.

2. The method of claim 1, further comprising accessing metadata associated with the data to determine content that is associated with the data.

3. The method of claim 2, wherein the content includes downloaded content associated with the data.

4. The method of claim 1, wherein determining two or more operations to be performed on the data comprises tracking data schema changes from the current data schema to the updated data schema.

5. The method of claim 4, further comprising generating an operation roadmap that includes the data schema changes from the current data schema to the updated data schema.

6. The method of claim 1, further comprising generating a new data store associated with the updated data schema.

7. The method of claim 6, further comprising migrating the data to the new data store.

8. The method of claim 7, further comprising generating one or more checkpoints as the data is migrated to the new data store.

9. The method of claim 8, further comprising using at least one of the one or more checkpoints to resume data migration at a particular point when data migration is interrupted.

10. A computing device, comprising:
    a processing unit; and
    a memory for storing instructions that, when executed by the processing unit, performs a method, comprising:
        determining a current data schema associated with a current version of an application executing on the computing device;
        receiving an updated data schema;
        determining whether the current data schema is compatible with the updated data schema; and
        when it is determined that the current data schema is not compatible with the updated data schema:
            determining, based on information associated with the current data schema and the updated data schema, two or more operations that will convert the data in the current data schema to the updated data schema, wherein each of the two or more operations are associated with different data schemas; and
            performing the two or more operations on the data in a single conversion operation to change the data from the current data schema to the updated data schema.

11. The system of claim 10, further comprising instructions for generating a data store associated with the updated data schema.

12. The system of claim 11, further comprising instructions for migrating the data to the data store.

13. The system of claim 12, further comprising instructions for generating one or more checkpoints for the migrated data that indicate a progress of data that has been migrated to the data store.

14. The system of claim 10, wherein the data is previously downloaded content.

15. The system of claim 10, wherein determining, based on information associated with the current data schema and the updated data schema, two or more operations that will convert the data in the current data schema to the updated data schema comprises tracking data schema changes from the current data schema to the updated data schema.

16. The system of claim 15, further comprising instructions for generating an operation roadmap that includes the data schema changes from the current data schema to the updated data schema.

17. A method, comprising:
- determining a current data schema associated with an application executing on a computing device;
- receiving an updated data schema associated with the application;
- determining which data in the current data schema is affected by the updated data schema;
- generating a new storage area associated with the updated data schema;
- determining two or more operations that will convert the affected data in the current data schema to the updated data schema; and
- migrating the affected data to the new storage area, wherein migrating the affected data to the new storage area comprises performing the two or more operations on the affected data in a single conversion operation.

18. The method of claim 17, further comprising generating one or more checkpoints for the migrated data that indicate a progress of data that has been migrated to the data store.

19. The method of claim 17, wherein the updated data schema is received with an update to the application.

20. The method of claim 17, wherein non-affected data is stored in a data store associated with the current data schema.

* * * * *